(12) United States Patent
Shen et al.

(10) Patent No.: US 9,190,918 B2
(45) Date of Patent: Nov. 17, 2015

(54) CONTROLLERS AND RELATED CONTROL METHODS FOR GENERATING SIGNALS REPRESENTING AN OUTPUT CURRENT TO A LOAD IN A SWITCHED MODE POWER SUPPLY

(71) Applicant: Grenergy Opto Inc., Hsin-Chu (TW)

(72) Inventors: Yi-Lun Shen, Hsin-Chu (TW); Yu-Yun Huang, Hsin-Chu (TW)

(73) Assignee: GRENERGY OPTO INC., Hsin-Chu (TW)

( * ) Notice: Subject to any disclaimer, the term of this patent is extended or adjusted under 35 U.S.C. 154(b) by 207 days.

(21) Appl. No.: 14/094,584

(22) Filed: Dec. 2, 2013

(65) Prior Publication Data

US 2015/0155786 A1 Jun. 4, 2015

(51) Int. Cl.
| | |
|---|---|
| H02J 3/12 | (2006.01) |
| G05F 1/00 | (2006.01) |
| H02M 3/335 | (2006.01) |
| H02M 7/5383 | (2007.01) |
| H02M 1/32 | (2007.01) |
| H02M 1/00 | (2007.01) |

(52) U.S. Cl.
CPC ............ *H02M 3/33523* (2013.01); *H02M 1/32* (2013.01); *H02M 2001/0009* (2013.01)

(58) Field of Classification Search
USPC ................ 323/242, 246, 268, 271, 274–277, 323/283–288; 363/21.01, 21.12, 21.13, 363/21.15–21.18, 74, 75, 78–80
See application file for complete search history.

(56) References Cited

U.S. PATENT DOCUMENTS

| | | | | |
|---|---|---|---|---|
| 9,042,124 | B1* | 5/2015 | Choi et al. | 363/20 |
| 2010/0321956 | A1* | 12/2010 | Yeh | 363/16 |
| 2012/0230065 | A1* | 9/2012 | Choi et al. | 363/21.18 |
| 2013/0057234 | A1* | 3/2013 | Shen et al. | 323/234 |
| 2013/0070483 | A1* | 3/2013 | Huang | 363/15 |
| 2013/0294118 | A1* | 11/2013 | So et al. | 363/21.16 |

\* cited by examiner

*Primary Examiner* — Adolf Berhane
*Assistant Examiner* — Gary Nash
(74) *Attorney, Agent, or Firm* — McClure, Qualey & Rodack, LLP

(57) ABSTRACT

Controllers and related control methods for a switched mode power supply are disclosed. The switched mode power supply has an inductive device and a power switch connected in series. An output current estimator in a controller is configured for receiving a current-sense signal representing an inductor current flowing through the inductive device and a discharge-time signal indicating a discharge time of the inductive device. The output current estimator generates a charge current in response to the discharge-time signal and the current-sense signal, thereby the charge current substantially corresponding to an output current that the switched mode power supply outputs to a load. The charge current is limited not to exceed a maximum value. A current limiter is configured for limiting the current-sense signal when the charge current is the maximum value.

18 Claims, 4 Drawing Sheets

CONTROLLERS AND RELATED CONTROL METHODS FOR GENERATING SIGNALS REPRESENTING AN OUTPUT CURRENT TO A LOAD IN A SWITCHED MODE POWER SUPPLY

BACKGROUND

The present disclosure relates generally to switched mode power supplies, and especially to power supplies capable of generating and employing signals estimating an output current to a load.

A switched mode power supply commonly utilizes a power switch to control the current flowing through an inductive device. In comparison with other kinds of power supply, switched mode power supplies usually enjoy compact size and excellent conversion efficiency, and are accordingly popular in the art.

Power supplies with flyback topology are welcome because they provide Galvanic isolation. Flyback topology employs a transformer to direct-current isolate input power lines electrically connected to an AC mains outlet from output power lines electrically connected to a load. A primary side commonly refers to the side where the circuits are connected to input power lines, and a secondary side refers to the side where the circuits are connected to output power lines. Secondary side control uses resistors or devices in the secondary side to directly sense the current flowing to a load or the voltage across the load. Output voltage and current regulation can be easily achieved using secondary side control in expense of extra power consumption as the device in the secondary side constantly consume electrical power all the time, probably lowering power conversion efficiency. US patent application publication US20100321956A1, which is incorporated herein by reference in its entirety, discloses several switched mode power supplies employing primary side control to regulate their output currents in the secondary side. US patent application publication US20100321956A1 could make the maximum output current from a switched mode power supply a constant, independent from the voltages at input power lines.

Load compensation is a kind of skill to increase the output voltage of a power supply when an output current to a load increases, in order to compensate the voltage lost over the cables connected between a load and the power supply. One conventional method to achieve load compensation is by using a peak current through a transformer to represent the output current to a load and to adjust a target voltage that an output voltage of a power supply tends to approach. As known in the art, the peak current is so different from the output current and can hardly represent it.

BRIEF DESCRIPTION OF THE DRAWINGS

The invention can be more fully understood by the subsequent detailed description and examples with references made to the accompanying drawings, wherein.

DETAILED DESCRIPTION

An embodiment of the invention has a controller in the primary side, which generates estimation signals in response to a current flowing through the primary winding of a transformer and a discharge time of the transformer. One of estimation signals is a charge current, generation method of which will be detailed to prove its representativeness of an output current of a power supply. By limiting the maximum value of the charge current, the output current can also be regulated to be no more than the maximum rating of the power supply. Furthermore, as the charge current accurately or considerably represents the output current, it can act as one input to generate an offset current for load compensation, obtaining a much-well-controlled result.

Figure 1:
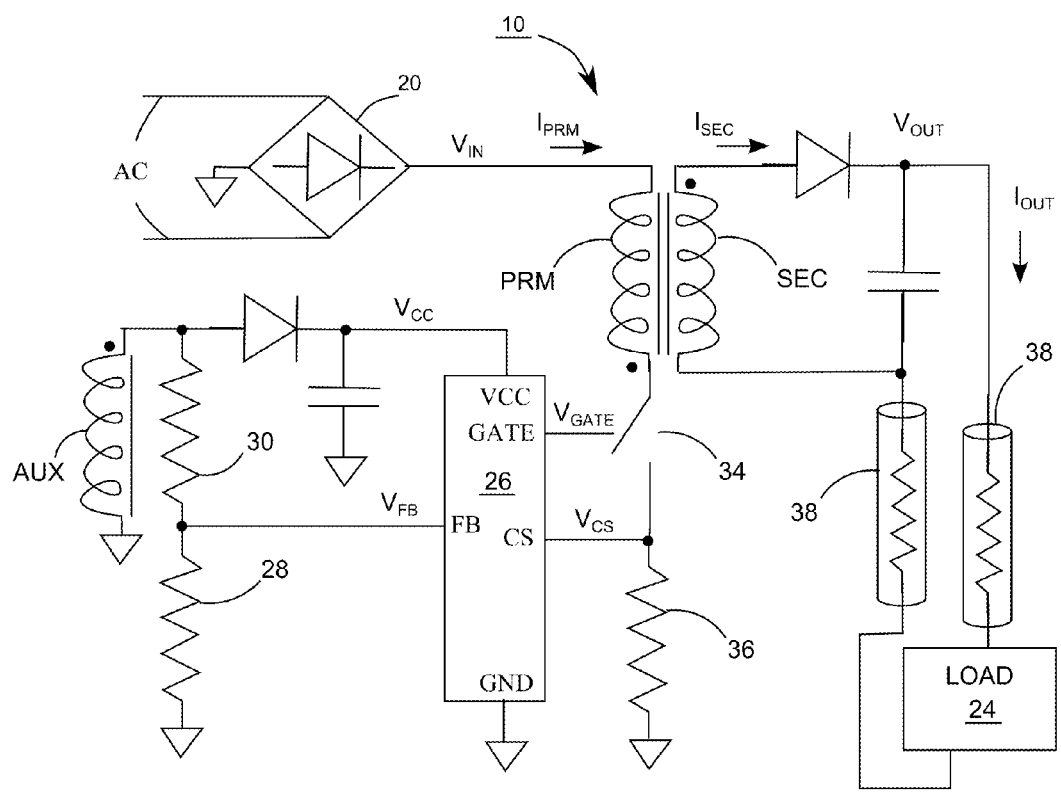
FIG. 1 shows a switched mode power supply according to embodiments of the invention.

FIG. 1 is a non-limiting switched mode power supply 10 according to embodiments of the invention, which employs primary side control. Bridge rectifier 20 performs full-wave rectification, converting the alternative-current (AC) power source from an AC mains outlet into a direct-current (DC) input power source $V_{IN}$. The voltage of input power source $V_{IN}$ could have an M-shaped waveform or be substantially a constant. Power controller 26 could be an integrated circuit with pins connected to peripheral devices. Via driving node GATE, power controller 26 periodically turns ON and OFF a power switch 34. When power switch 34 is ON, a primary winding PRM of the transformer energizes. When it is OFF, the transformer de-energizes via a secondary winding SEC and an auxiliary winding AUX to build up an output power source $V_{OUT}$ for load 24 and operation a power source $V_{CC}$ for power controller 26. Connected between load 24 and the secondary winding SEC are cables 38, whose resistances are denoted by resistors therein.

A voltage divider consisting of resisters 28 and 30 detects voltage drop $V_{AUX}$ over the auxiliary winding AUX, to provide a feedback voltage signal $V_{FB}$ to a feedback node FB of power controller 26. When power switch 34 is OFF, the voltage drop $V_{AUX}$ is a reflective voltage in proportion to the voltage drop across the secondary winding SEC. Based on feedback voltage signal $V_{FB}$, power controller 26 controls the duty cycle of the power switch 34 accordingly. Via a current-sense node CS, power controller 26 detects current-sense voltage $V_{CS}$, which represents the current $I_{PRM}$ flowing through not only the current-sense resistor 36, but also power switch 34 and primary winding PRM.

Figure 2:
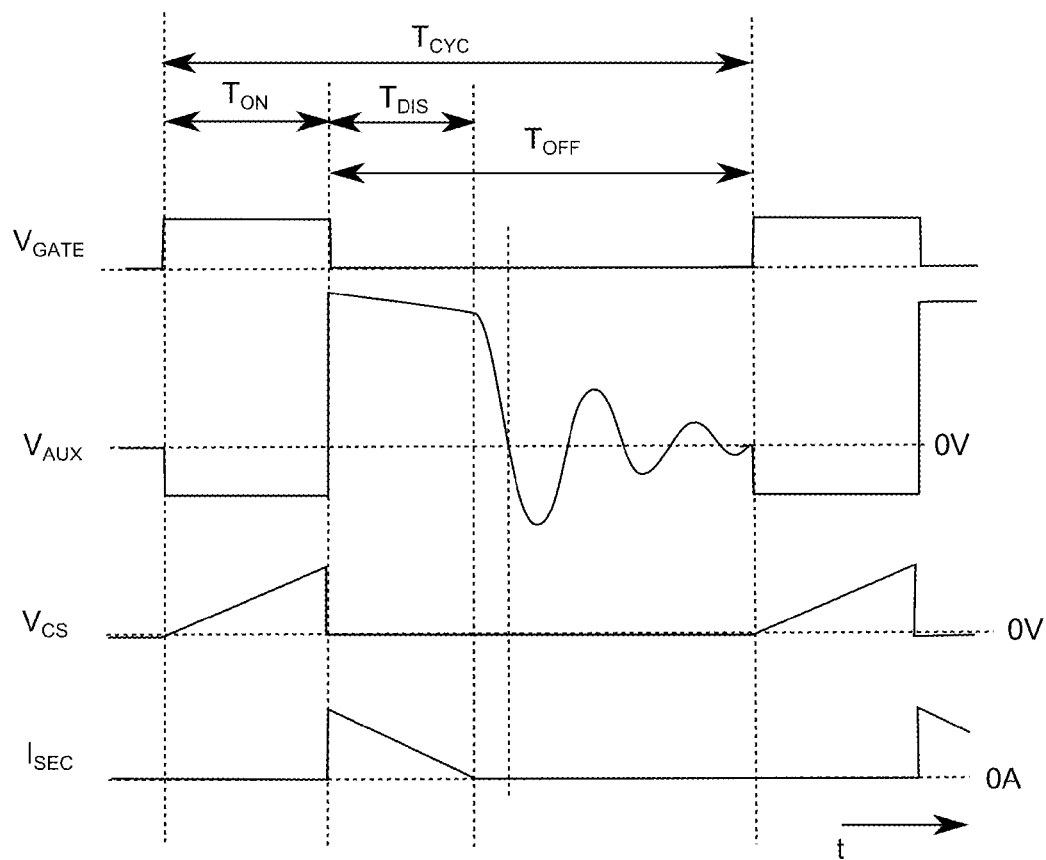
FIG. 2 demonstrates some waveforms of the signals in FIG. 1.

FIG. 2 demonstrates some waveforms of the signals in FIG. 1. Driving signal $V_{GATE}$ on the driving node GATE is 1 in logic to turn on the power switch 34. The period of time when the power switch 34 is ON is named as ON time $T_{ON}$, and that when the power switch is OFF is OFF time $T_{OFF}$, as shown in FIG. 2. One cycle time $T_{CYC}$ is equal to the combination of one ON time $T_{ON}$ and one OFF time $T_{OFF}$, shown in FIG. 2. During ON time $T_{ON}$, the voltage drop $V_{AUX}$ is negative, reflecting the voltage of the input power source $V_{IN}$. Meanwhile, current-sense voltage $V_{CS}$, which in a way represents the primary-winding current $I_{PRM}$, increases over time as primary winding PRM energizes. At the moment when the power switch 34 is switched to be OFF, the secondary winding SEC starts generating the secondary-winding current $I_{SEC}$, which decreases over time until the secondary winding SEC completely de-energizes. As shown in FIG. 2, The period of time when the secondary winding SEC is de-energizing or the secondary-winding current $I_{SEC}$ is positive is named as discharge time $I_{DIS}$. During discharge time $T_{DIS}$, the voltage drop $V_{AUX}$ is positive, substantially reflecting the voltage of the output power source $V_{OUT}$. After the discharge time $T_{DIS}$, the voltage drop $V_{AUX}$ oscillates and converges to 0. In FIG. 2, discharge time $T_{DIS}$ is only a portion of OFF time $T_{OFF}$ because the switched mode power supply 10 is supposed to operate in discontinuous conduction mode (DCM). In case that the switched mode power supply 10 operates in continuous conduction mode (CCM), the discharge time $T_{DIS}$ is about the same as the OFF time $T_{OFF}$.

Figure 3:
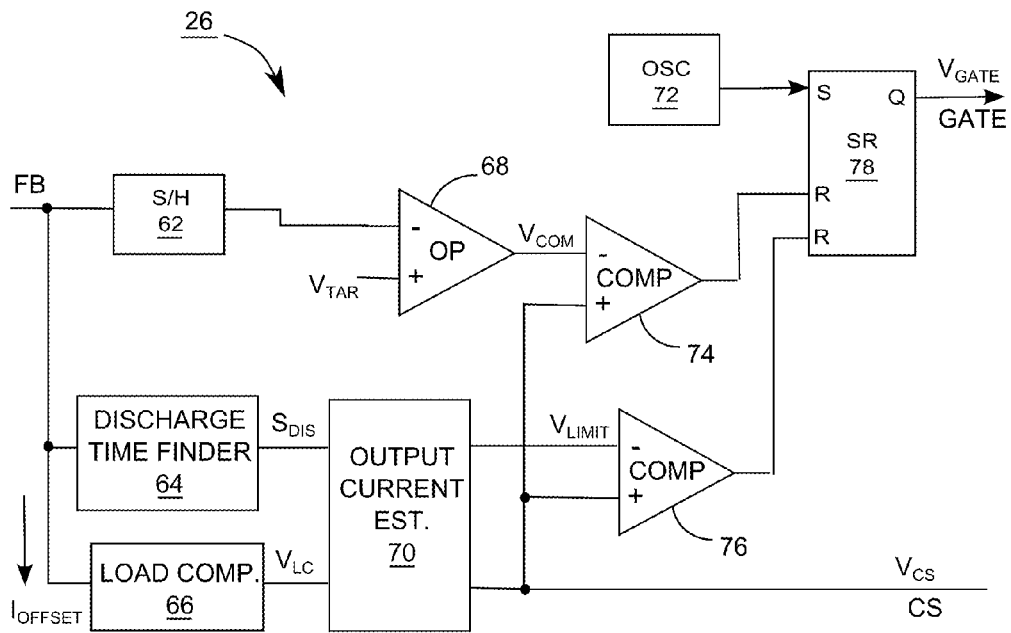
FIG. 3 exemplifies the power controller in FIG. 1.

FIG. 3 exemplifies the power controller 26 in FIG. 1. An oscillator 72 periodically sets the SR register 78 such that driving signal $V_{GATE}$ becomes 1 in logic, starting ON time $T_{ON}$. A sample and hold circuit 62 samples feedback voltage signal $V_{FB}$ timely during the discharge time $T_{DIS}$, and an error amplifier 68 compares a predetermined target voltage $V_{TAR}$ with the output of sample and hold circuit 62 to generate compensation voltage $V_{COM}$. When current-sense voltage $V_{CS}$ exceeds compensation voltage $V_{COM}$, comparator 74 resets the SR register 78, starting OFF time $T_{OFF}$, during which current-sense voltage $V_{CS}$ suddenly drops to 0 as shown in FIG. 2. In other words, the compensation voltage $V_{COM}$ controls the peak value of current-sense voltage $V_{CS}$.

A discharge time finder 64 is connected to feedback node FB, and by detecting the waveform of feedback voltage signal $V_{FB}$ it provides a discharge-time signal $S_{DIS}$, to indicate the duration of discharge time $T_{DIS}$. The discharge-time signal $S_{DIS}$ is not necessary to be synchronous with the discharge time $T_{DIS}$. In one embodiment for example, the discharge-time signal $S_{DIS}$ turns into 1 in logic later than the discharge time $T_{DIS}$ starts and into 0 in logic later than the discharge time $T_{DIS}$ ends, such that the duration when the discharge-time signal $S_{DIS}$ is 1 is about equal to the duration of the discharge time $T_{DIS}$.

In response to the discharge-time signal $S_{DIS}$ and the current-sense voltage $V_{CS}$, an output current estimator 70 provides load representative $V_{LC}$ to load compensation circuit 66, where load representative $V_{LC}$ corresponds to a charge current $I_{CHARGE}$ which, as will be detailed later, is substantially in proportion to output current $I_{OUT}$ to load 24 of FIG. 1. Load compensation circuit 66 generates an offset current $I_{OFFSET}$ draining from the feedback node FB to ground during the discharge time $T_{DIS}$. Generally, the larger the output current $I_{OUT}$, the larger the charge current $I_{CHARGE}$, the larger the offset current $I_{OFFSET}$, the higher the voltage drop $V_{AUX}$ to keep the output of the sample and hold circuit 62 substantially equal to the target voltage $V_{TAR}$, the higher the output power source $V_{OUT}$. Accordingly, load compensation circuit 66 could render the output power source $V_{OUT}$ to be substantially equal to the equation of "$I_{OUT}*K_1+K_2*V_{TAR}$", where $K_1$ and $K_2$ are two constants. With proper resistance selection on resistors 28 and 30, $I_{OUT}*K_1$ could compensate the voltage drop across the cables 38 in FIG. 1, such that the load 24 receives a well-regulated power source with voltage of $K_2*V_{TAR}$. According, load compensation can be achieved precisely.

Output current estimator 70 further provides limiting voltage $V_{LIMIT}$ to comparator 76. Once the current-sense voltage $V_{CS}$ exceeds the limiting voltage $V_{LIMIT}$, comparator 76 resets SR register 78, ending ON time $T_{ON}$ and starting OFF time $T_{OFF}$. Limiting voltage $V_{LIMIT}$ could control the peak value of current-sense voltage $V_{CS}$.

Figure 4:
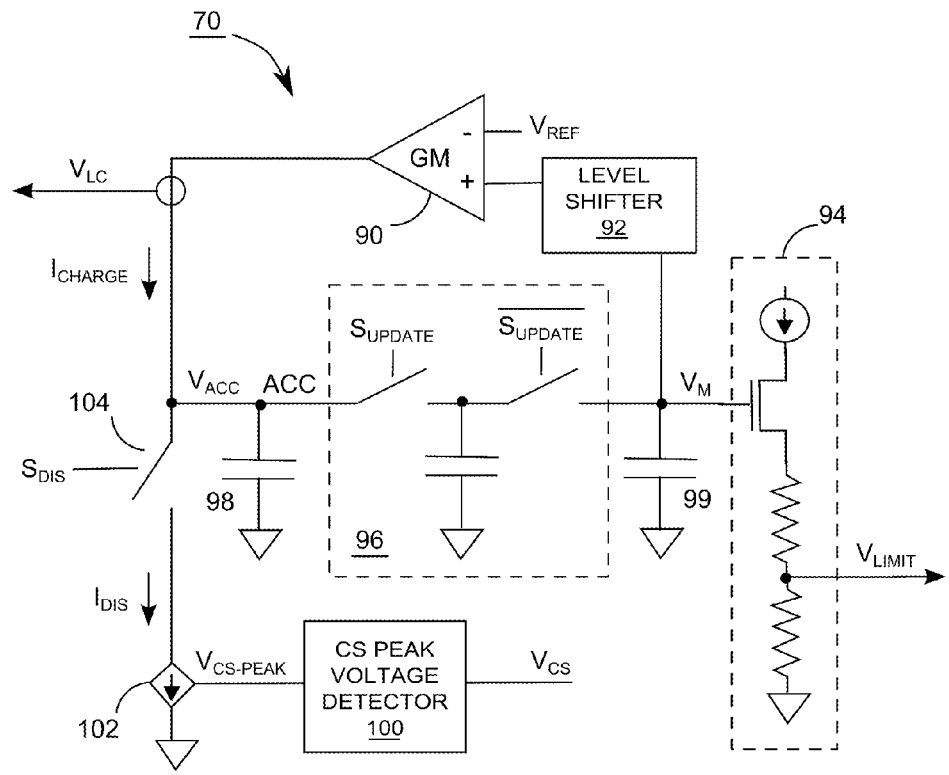
FIG. 4 exemplifies the output current estimator in FIG. 3.

FIG. 4 exemplifies output current estimator 70, which has a transconductor 90, level shifters 92 and 94, an update circuit 96, an accumulation capacitor 98, a switch 104, a voltage-controlled current source 102, and a CS peak voltage detector 100.

CS peak voltage detector 100 generates voltage $V_{CS-PEAK}$ representing the peak value of the current-sense voltage $V_{cs}$. An embodiment of CS peak voltage detector 100 has been shown by FIG. 10 in US patent application publication US20100321956A1. In some embodiments, the CS peak voltage detector 100 could be replaced by an average voltage detector exemplified by FIG. 17 or 18 in US patent application publication US20100321956A1. Voltage-controlled current source 102 converts voltage $V_{CS-PEAK}$ into a discharge current $I_{DIS}$, which discharges the accumulation node ACC only when discharge-time signal $S_{DIS}$ is 1 in logic. In other word, the discharge current $I_{DIS}$ equivalently discharges the accumulation node ACC during the discharge time $T_{DIS}$. Switch 104 shown in FIG. 4 might be omitted in some other embodiments where the discharge-time signal $S_{DIS}$ is used to activate or deactivate the voltage-controlled current source 102. Voltage $V_M$ on capacitor 99 is level-shifted to compare with a predetermined reference voltage $V_{REF}$ by transconductor 90, which accordingly outputs a charge current $I_{CHARGE}$ charging the accumulation node ACC all the time. By sensing charge current $I_{CHARGE}$, load representative $V_{LC}$ is generated. Update circuit 96 samples feedback voltage $V_{ACC}$ at the accumulation node ACC to update voltage $V_M$, preferably once every cycle time $T_{CYC}$. It does not matter when update signal $S_{UPDATE}$ triggers the updating during one cycle time $T_{CYC}$. In one embodiment, for example, the update signal $S_{UPDATE}$ could be an equivalent to the driving signal $V_{GATE}$, meaning the updating is performed at the moment when OFF time starts. Voltage $V_M$ is kept as a constant until it is updated by update circuit 96 to become another constant. Level shifter 94 provides limiting voltage $V_{LIMIT}$ in response to voltage $V_M$. It can be derived that the charge current $I_{CHARGE}$ stays uncharged if the voltage $V_M$ is not changed.

Similar to the analysis in US patent application publication US20100321956A1, if the charge current $I_{CHARGE}$ is a constant and the feedback voltage $V_{ACC}$ at the sampling moment when update circuit 96 performs sampling is the same as it was at the previous sampling moment, the charge current $I_{CHARGE}$ is in proportion to the output current $I_{OUT}$ outputted to the load 24. To have the charge current $I_{CHARGE}$ in proportion to the output current $I_{OUT}$, the value of the feedback voltage $V_{ACC}$ at the moment when the feedback voltage $V_{ACC}$ is sampled must be the same, or stable. Update circuit 96, level shifter 92, and transconductor 90 together form a loop with a negative loop gain, and this loop eventually could stabilize the value of the feedback voltage $V_{ACC}$ at the moment when the feedback voltage $V_{ACC}$ is sampled. If the charge current $I_{CHARGE}$ is larger than an expected value proportional to the output current $I_{OUT}$, for example, the feedback voltage $V_{ACC}$ becomes larger at the next sampling moment, voltage $V_M$ increases when updated, such that the charge current $I_{CHARGE}$ becomes less in the next cycle time, and vice versa. The charge current $I_{CHARGE}$ could approach the expected value automatically. With an appropriate negative loop gain, regardless to what the charge current $I_{CHARGE}$ initially is, voltage $V_M$ could converge and the charge current $I_{CHARGE}$ eventually be in proportion to the output current $I_{OUT}$.

Figure 5A:
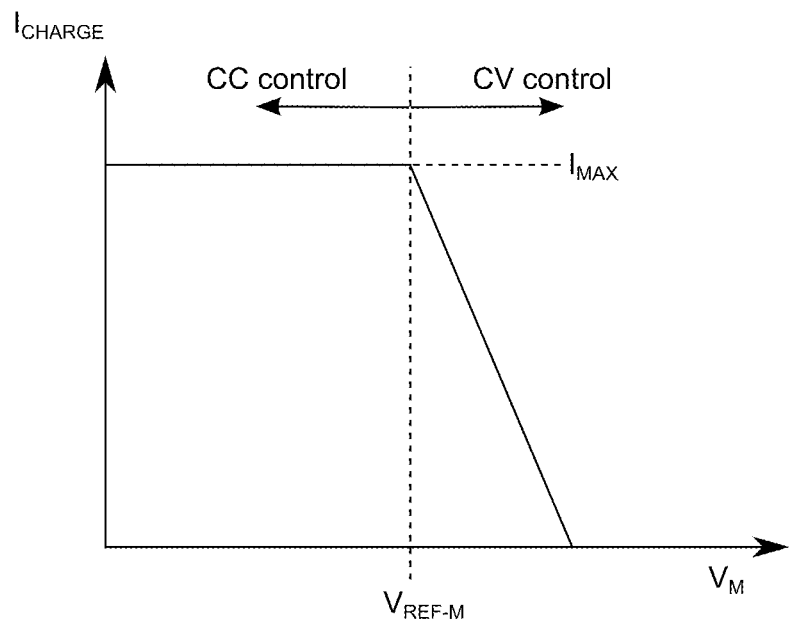
FIG. 5A demonstrates a relationship between the charge current $I_{CHARGE}$ and voltage $V_M$ according to embodiments of the invention.

FIG. 5A demonstrates a relationship between the charge current $I_{CHARGE}$ and voltage $V_M$ according to embodiments of the invention. Voltage $V_M$ controls the charge current $I_{CHARGE}$ via level shifter 92 and tranconductor 90. As shown in FIG. 5A, the charge current $I_{CHARGE}$ is never negative. When voltage $V_M$ is below a predetermined voltage $V_{REF-M}$ corresponding to the predetermined reference voltage $V_{REF}$ in FIG. 4, the charge current $I_{CHARGE}$ is about a maximum value, which is $I_{MAX}$ shown in FIG. 5A.

When load 24 is modest or light, and output current $I_{OUT}$ has not reached its maximum rating, voltage $V_M$ should stay at somewhere above the predetermined voltage $V_{REF1}$ in FIG. 5A and the charge current $I_{CHARGE}$ is in proportion to the output current $I_{OUT}$. Meanwhile, the power controller 26 (of FIG. 3) performs constant output voltage control, regulating the output voltage $V_{OUT}$. When load 24 is so heavy, the charge current $I_{CHARGE}$ is fixed to $I_{MAX}$, and voltage $V_M$ is below the predetermined voltage $V_{REF-M}$ in FIG. 5A. In the meantime, if the output current $I_{OUT}$ exceeds its maximum rating in proportion to $I_{MAX}$, both voltage $V_M$ and limiting voltage $V_{LIMIT}$ decrease cycle by cycle until the limiting voltage $V_{LIMIT}$ lowers the voltage $V_{CS-PEAK}$ to make the output current $I_{OUT}$ equal to its maximum rating. In other words, the power controller 26 could perform constant output current control when voltage $V_M$ is below the predetermined voltage $V_{RE-M}$.

The transconductance of transconductor 90 substantially determines the range where voltage $V_M$ would locate for constant output voltage control. The higher transconductance, the tighter range, the wider headroom for the feedback voltage $V_{ACC}$ to operate properly. The transconductance cannot be too large nevertheless, because increasing transconductance also increases the negative loop gain, where an over-large negative loop gain could result in oscillation and unstable voltage $V_M$.

Figure 5B:
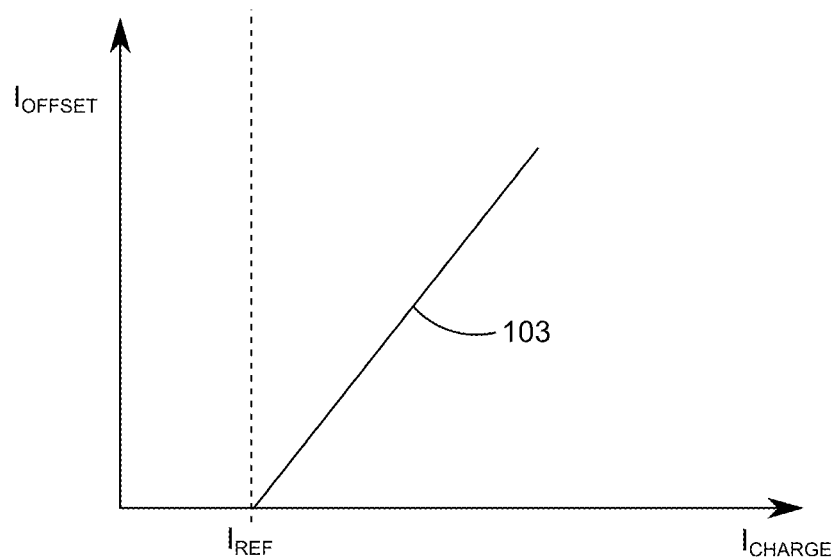
FIG. 5B demonstrates a relationship between the offset current $I_{OFFSET}$ and charge current $I_{CHARGE}$ according to embodiments of the invention.

FIG. 5B demonstrates a relationship between the offset current $I_{OFFSET}$ and charge current $I_{CHARGE}$ that the load compensation circuit 66 performs according to embodiments of the invention. In one embodiment, by mirroring the charge current $I_{CHARGE}$ load representative $V_{LC}$ and the offset current $I_{OFFSET}$ could be generated. It is preferred in some embodiments that load compensation is not performed during light load or no load. Accordingly, when the charge current $I_{CHARGE}$ is below a predetermined level $I_{REF}$ shown in FIG. 5B, the offset current $I_{OFFSET}$ is about 0A according to an embodiment of the invention. Otherwise, the offset current $I_{OFFSET}$ has a linear relationship with the charge current $I_{CHARGE}$ as the tilted, straight line 103 in FIG. 5B demonstrates.

Output current estimator 70, which employs only one internal loop with a negative loop gain, achieves two essential functions: providing the discharge current $I_{CHARGE}$ substantially in proportion to output current $I_{OUT}$, and controlling the output current $I_{OUT}$ below or equal to its maximum rating.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A controller for a switched mode power supply with an inductive device and a power switch connected in series, the controller comprising:
    an output current estimator, configured for receiving a current-sense signal representing an inductor current flowing through the inductive device and a discharge-time signal indicating a discharge time of the inductive device, and for generating a charge current in response to the discharge-time signal and the current-sense signal, thereby the charge current substantially corresponding to an output current that the switched mode power supply outputs to a load, wherein the charge current is limited not to exceed a maximum value; and
    a current limiter, configured for limiting the current-sense signal when the charge current is the maximum value;
    wherein the inductive device includes an auxiliary winding, the switched mode power supply has a resistor connected to the auxiliary winding, and the controller further comprises a load compensator configured for draining an offset current from the resistor in response to the charge current.

2. The controller as claimed in claim 1, wherein the offset current is about 0A when the charge current is below a predetermined reference current.

3. The controller as claimed in claim 1, wherein the charge current is never negative.

4. The controller as claimed in claim 1, wherein the output current estimator generates a voltage signal in response to the charge current, the discharge-time signal and the current-sense signal, the output current estimator further comprises a level shifter for converting the voltage signal into a second voltage signal, and the current limiter includes a comparator for comparing the second voltage signal with the current-sense signal to control the power switch.

5. A controller for a switched mode power supply with an inductive device and a power switch connected in series, the controller comprising:
    an output current estimator, configured for receiving a current-sense signal representing an inductor current flowing through the inductive device and a discharge-time signal indicating a discharge time of the inductive device, and for generating a charge current in response to the discharge-time signal and the current-sense signal, thereby the charge current substantially corresponding to an output current that the switched mode power supply outputs to a load, wherein the charge current is limited not to exceed a maximum value; and
    a current limiter, configured for limiting the current-sense signal when the charge current is the maximum value;
    wherein the output current estimator generates a voltage signal in response to the charge current, the discharge-time signal and the current-sense signal, and the output current estimator comprises a transconductor comparing the voltage signal with a reference voltage to generate the charge current.

6. The controller as claimed in claim 5, wherein the voltage signal is updated once every cycle time of the switched mode power supply.

7. The controller as claimed in claim 5, wherein the charge current charges an accumulation node all the time, the output current estimator provides a discharge current in response to the current-sense signal, the discharge current discharges the accumulation node during the discharge time, and the voltage signal is updated by sampling the feedback voltage at the accumulation node.

8. The controller as claimed in claim 7, wherein a peak value of the current-sense signal determines the discharge current.

9. The controller as claimed in claim 7, wherein the output current estimator further includes an accumulation capacitor connected to the accumulation node, and an update circuit connected to the accumulation node to sample the feedback voltage.

10. A control method for output current detection in a switched mode power supply with an inductive device and a power switch connected in series, the control method comprising:
    receiving a current-sense signal representing an inductor current flowing through the inductive device;

detecting the inductive device to generate a discharge-time signal indicating a discharge time of the inductive device;
generating a charge current in response to the discharge-time signal and the current-sense signal, thereby the charge current substantially representing an output current that the switched mode power supply outputs to a load;
limiting the charge current not to exceed a maximum value;
limiting the current-sense signal when the charge current is the maximum value;
providing a discharge current in response to the current-sense signal;
using the charge current to charge an accumulation node all the time and the discharge current to discharge the accumulation node during the discharge time; and
sampling a feedback voltage at the accumulation node to update the charge current.

11. The control method as claimed in claim 10, further comprising:
sampling the feedback voltage at the accumulation node to update a voltage signal: and
generating the charge current by comparing the voltage signal with a reference voltage.

12. The control method as claimed in claim 11, further comprising:
operating the switched mode power supply in a constant voltage mode when the voltage exceeds the reference voltage; and
operating the switched mode power supply in a constant current mode when the voltage is below the reference voltage.

13. The control method as claimed in claim 11, further comprising:
making, when the voltage signal is under the reference voltage, the charge current about the maximum value.

14. The control method as claimed in claim 10, further comprising:
forcing the charge current to be never negative.

15. A control method for output current detection in a switched mode power supply with an inductive device and a power switch connected in series, the control method comprising:
receiving a current-sense signal representing an inductor current flowing through the inductive device;
detecting the inductive device to generate a discharge-time signal indicating a discharge time of the inductive device;
generating a charge current in response to the discharge-time signal and the current-sense signal, thereby the charge current substantially representing an output current that the switched mode power supply outputs to a load;
limiting the charge current not to exceed a maximum value; and
limiting the current-sense signal when the charge current is the maximum value;
wherein the inductive device includes an auxiliary winding, the switched mode power supply comprises a resistor connected between the auxiliary winding and a feedback node, and the control method further comprises:
draining an offset current from the resistor in response to the charge current, thereby the switched mode power supply outputting a higher regulated output voltage for a higher offset current.

16. A controller for a switched mode power supply with an inductive device and a power switch connected in series, the controller comprising:
an output current estimator, configured for receiving a current-sense signal representing an inductor current flowing through the inductive device and a discharge-time signal indicating a discharge time of the inductive device, and for generating a charge current in response to the discharge-time signal and the current-sense signal, thereby the charge current substantially corresponding to an output current that the switched mode power supply outputs to a load; and
a load compensator, configured for draining a offset current from a resistor to a ground in response to the charge current;
wherein the inductive device includes an auxiliary winding, and the resistor is connected between the auxiliary winding and the load compensator.

17. The controller as claimed in claim 16, wherein the charge current is limited not to exceed a maximum value.

18. The controller as claimed in claim 17, wherein the output current estimator makes the charge current not negative.

* * * * *